Dec. 4, 1951

J. W. ALEXANDER ET AL 2,577,443

RADIO BEACON SYSTEM

Filed Dec. 6, 1947

INVENTORS
JOHAN WILLEM ALEXANDER AND
BALTHAZAR JAN WESSELINK
BY [signature]
AGENT Patented Dec. 4, 1951

2,577,443

UNITED STATES PATENT OFFICE 2,577,443

RADIO BEACON SYSTEM

Johan Wiliem Alexander and Balthazar Jan Wesselink, Eindhoven, Netherlands, assignors to Hartford National Bank and Trust Company, Hartford, Conn., as trustee Application December 6, 1947, Serial No. 790,208
In the Netherlands December 12, 1946

7 Claims. (Cl. 343—107)

For indicating a guiding plane according to the amplitude comparison method transmitting devices are known by which signals modulated with different frequencies are sent out with mutually overlapping directional diagrams.

Moreover, direction-finding apparatus based on analogous principles are known in which signals received with overlapping directional diagrams are modulated with modulating voltages of different frequency.

In both cases the plane of symmetry of the overlapping directional diagrams forms a guiding plane whilst departure of the receiver or transmitter from this plane is made known at the receiver side by the predominance of one of the, for example audible, modulation frequencies.

For the purpose of modulating the signals to be transmitted or received with the two modulating voltages, the transmitting and receiving devices referred to above comprise two modulators. Mutual variation of the amplification, attenuation or phase rotation of these modulators caused undesired large displacements of the guiding plane direction aimed at, which leads to requirements as regards the modulators and the array following thereafter (for example, amplifiers, transmission lines etc.), which can be satisfied in practice only with difficulty.

The invention has for its object to avoid these practical difficulties.

According to the invention, in a transmitting device of the kind referred to, the signal to be transmitted is modulated for this purpose in a first modulator with a voltage obtained by addition from the said modulating voltages and in a second modulator with carrier-wave suppression, with a voltage obtained by subtraction from the modulating voltages, the output voltages of the first and the second modulator being transmitted on either side of the guiding plane in phase and in anti-phase respectively. Alternatively, the voltage applied to the first modulator may be obtained by the subtraction of the two modulation voltages, while the voltage applied to the second modulator may be obtained by the addition of the two modulation voltages.

According to the invention, with a direction-finding apparatus of the above-described type signals received on either side of the guiding plane are supplied in phase and in anti-phase respectively to a first and a second modulator whilst the received signal is modulated in the first modulator with a voltage obtained by addition from the said modulating voltages and in the second modulator, with carrier-wave suppression, with a voltage obtained by subtraction from the modulating voltages, the output voltages of the modulators controlling, after detection, an optical or acoustic indicating device.

Figure 1:
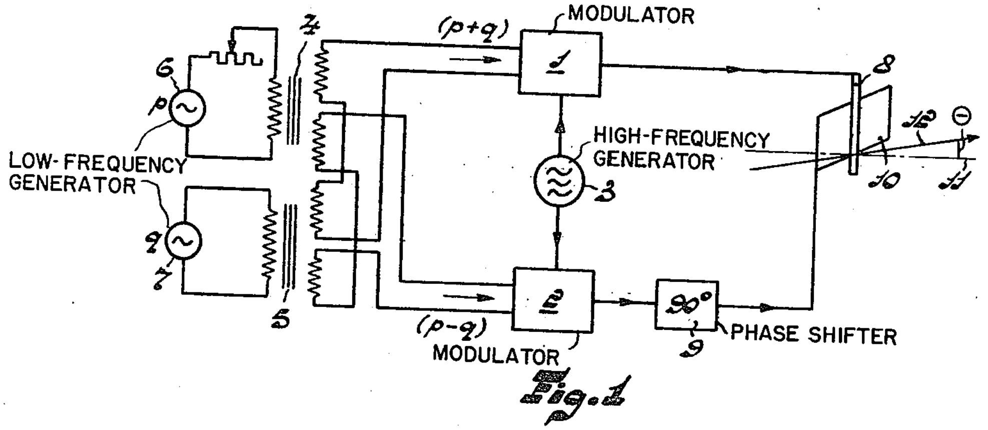
Figure 2:
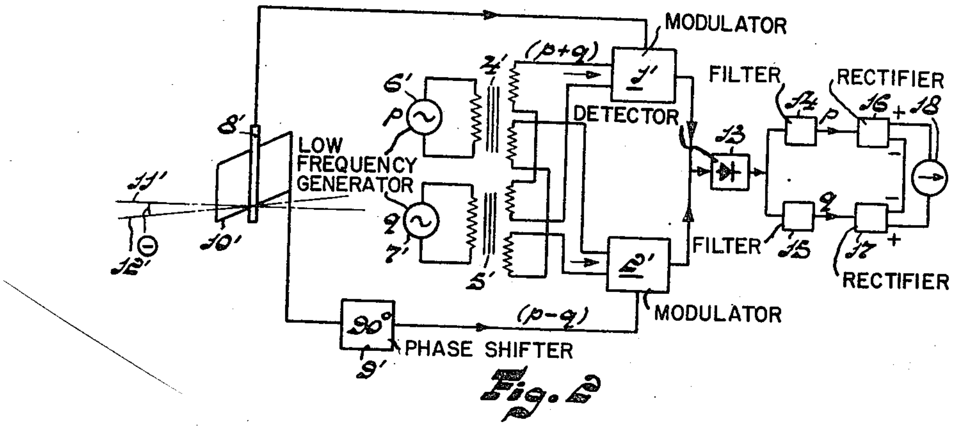

The invention will be explained more fully with reference to the accompanying drawing wherein Figs. 1 and 2 represent the diagrams of a transmitting and a receiving device respectively according to the invention.

The beacon transmitter shown in Fig. 1 comprises two modulators 1 and 2 to which carrier-wave signals produced by a high-frequency generator 3 are supplied. To the first modulator 1 is supplied as the modulating voltage a voltage obtained by sum-forming with the aid of two transformers 4 and 5 from voltages with frequencies $p$ and $q$ which are produced by low-frequency generators 6 and 7.

If A and $\omega$ represent the amplitude and the frequency respectively of the carrier-wave signal and if $m_1$ and $m_2$ represent the modulation depths for the signals $p$ and $q$ respectively, the output signal $e_1$ of modulator 1 may be indicated as follows:

$$e_1=A \sin \omega t(1+m_1 \sin pt+m_2 \sin qt) \quad (1)$$

This output signal is transmitted by means of a non-directional vertical antenna 8.

The second modulator 2 has supplied to it as the modulating voltage a voltage obtained by subtraction from the low-frequency signals $p$ and $q$ with the aid of the transformers 4 and 5. The modulator 2 is constructed as a balance modulator so that carrier-wave suppression occurs and if A' represents the carrier-wave amplitude and $m_3$ and $m_4$ represent the modulation depths for the signals $p$ and $q$ respectively, the output signal $e_2$ may be indicated by the following formula:

$$e_2=A' \sin \omega t(m_3 \sin pt-m_4 \sin qt) \quad (2)$$

This output signal is supplied, via a device 9 causing a phase displacement of 90°, to a frame antenna 10 which is located in a vertical plane and which is symmetrically mounted with respect to a non-directional antenna 8 in such manner that the minimum direction 11 of the frame antenna diagram corresponds with the guiding plane direction desired.

A receiving device provided, for example, with a non-directional antenna located in a direction 12 which includes an angle $\theta$ with the guiding plane direction 11, receives a signal coming from the non-directional antenna of the beacon transmitter, which signal is proportional to:

$$\sin \omega t(1+m_1 \sin pt+m_2 \sin qt) \quad (3)$$

whilst from the frame antenna of the beacon transmitter a voltage is received which depends in phase and in amplitude upon the direction and the degree of deflection from the guiding plane respectively and which, in the case of a small course-deflection angle $\theta$, is proportional to:

$$\pm\theta \sin t(m_3 \sin pt-m_4 \sin qt) \quad (4)$$

By detection of these signals received by a single antenna a voltage $e_D$ is obtained which, if $k$ represents a proportionality factor, corresponds to:

$$e_D=k(m_1 \sin pt\pm\theta m_3 \sin pt+m_2 \sin qt\pm\theta m_4 \sin qt) \quad (5)$$

It appears therefrom that on one side of the guiding plane the signals of the frequency $p$ which are received from both transmitting antennae are in phase and consequently support one another whereas the signals of the frequency $q$ are in anti-phase and consequently counteract one another.

If at the side of the transmitter care is taken to ensure that $m_1$ is equal to $m_2$ (the amplitudes of the low-frequency signals $p$ and $q$ supplied to the modulator 1 being equal in this case) both modulating voltages $p$ and $q$ have the same amplitude in the guiding-plane direction coinciding with the minimum direction of the frame diagram ($\theta=0$) whereas upon departure from the guiding-plane to the side mentioned in the preceding paragraph, the signal $p$ predominates with respect to $q$. Upon departure from the guiding plane to the other side, on the contrary, it is the voltage $q$ that predominates. In both cases the amplitude difference of the signals $p$ and $q$ increases in accordance with the increase of the departure from the guiding plane.

If, as indicated above, $m_1$ is equal to $m_2$, variation of the ratio of the amplitudes of the signals $p$ and $q$ supplied to the modulator 2($m_3:m_4$) has no influence upon the guiding-plane direction but acts only upon the sharpness of definition of the guiding plane.

Phase displacements of the low-frequency voltages $p$ and $q$, even if they are different for the two voltages and/or for the two modulator inputs, neither cause variations of the guiding-plane direction but, as before, they modify the sharpness of definition of the guiding-plane.

A mutual phase variation of the high-frequency voltages in both transmitter channels exerts an influence analogous to that of the previously mentioned low-frequency phase displacements, the adjustment of the network 9 causing a phase-shift of 90° being therefore not critical.

Slight displacements of the guiding plane direction, for example for the automatic correction thereof with the aid of a check receiver arranged in the guiding-plane direction desired, may be brought about in a simple manner by modifying the amplitude ratio of the signals $p$ and $q$ supplied to the modulator 1. For this purpose, preferably, for example, only the amplitude of the signal $p$ supplied to the modulator 1 is modified.

However, a simultaneous variation of the signal $p$ supplied to the modulator 2 does not introduce unallowable faults in the indication at the receiver, so that for the purpose of correction, for example the amplitude of the signal $p$ derived from the generator 6 may be adjusted by means of a variable resistance.

It may be pointed out that as soon as $m_1$ is equal to $m_2$, high- and/or low-frequency phase shifts in the transmitter may bring about a, although slight, variation of the guiding-plane direction adjusted.

Fig. 2 represents diagrammatically a direction-finding apparatus based on the same principles as the transmitter shown in Fig. 1, similar parts being denoted by the same but accented, reference numerals.

A signal, for example a non-modulated carrier-wave signal, coming from an arbitrary transmitter is intercepted by a non-directional antenna 8′ and a frame antenna 10′. The non-directionally received signal is modulated in a modulator 1′ with a voltage of frequencies $p$ and $q$ obtained by addition with the aid of transformer 4′ and 5′ from low-frequency generators 6′ and 7′. The output signal of this modulator is proportional to the signal indicated hereinbefore at (3).

Signals intercepted by a frame antenna 10′ and coming-in from directions located on either side of the minimum direction of the frame antenna diagram, are received in anti-phase and, consequently, if A′′ and $\omega$ represent amplitude and frequency respectively, may be represented by:

$$e_R=\pm\theta A'' \sin \omega t \quad (6)$$

In the modulator 2′ this signal is modulated, with carrier wave suppression, with a voltage obtained, by subtraction, from the signals $p$ and $q$. The output signal of this modulator is proportional to the signal indicated above at (4).

Combination of the output signals of the two modulators 1′ and 2′ yields a high-frequency signal which exactly corresponds to the signal received by a non-directional receiving antenna with the use of a beacon transmitter according to Fig. 1. The further treatment of this signal may consequently take place in both cases in exactly the same manner.

With the receiver according to Fig. 2 variations of the amplification and/or the phase displacement in either of the two receiving channels have the same effect as analogous variations in both receiver channels according to Fig. 1, for they do not cause displacement of the guiding plane direction coinciding again with the minimum direction of the frame antenna diagram, unless $m_1$ is equal to $m_2$, but they modify the sharpness of definition of the guiding-plane.

Like with the transmitter according to Fig. 1, corrections of the guiding-plane direction may be realised by varying the amplitude of the signal $p$ or $q$ supplied to the modulator 1. The further handling of the signal obtained after combination of the output voltages of the modulators 1′ and 2′ may take place in different ways known per se for the amplitude comparison of two signals.

In Fig. 2, the low-frequency signals $p$ and $q$, after being detected by a detector 13, are separated as to frequency with the aid of filters 14 and 15 and subsequently they are separately rectified by rectifiers 16, 17 whereupon the output direct-currents control an optical indicating device 18 in opposite direction. If desired, the direct-current output signal obtained may be converted, as is well-known, into signals usually employed for acoustic indication (for example complementary signals) or use may be made of direct acoustic indication.

In the embodiments shown a frame antenna is used as the directional antenna. Instead of a frame antenna use may of course be made of an Adcock antenna. Otherwise it is by no means necessary to utilise a directional antenna the directional diagram of which exhibits only two diagram lobes being in anti-phase but with the same effect use may be made of antenna systems exhibiting, for example, a three-or multi-bladed diagram with adjacent lobes of opposite phase.

What we claim is:

1. In a radio beacon system, transmitting apparatus for indicating a guiding plane in accordance with the amplitude comparison method, said apparatus comprising a high-frequency carrier wave source, means to generate first and second low-frequency modulation voltages of different frequency, means to modulate said carrier wave with a resultant voltage produced by the addition of said first and second modulation voltages to develop a first output signal, means to modulate said carrier wave with another resultant voltage produced by the subtraction of said first and second modulation voltages to develop a second output signal, the carrier wave component in one of said output signals being suppressed, directional radiation means responsive to one of said output signals to propagate the signals in phase opposition on either side of said guiding plane, and non-directional radiation means responsive to the other of said output signals to propagate the signals in phase coincidence on either side of said guiding plane.

2. In a radio beacon system, transmitting apparatus for indicating a guiding plane in accordance with the amplitude comparison method, said apparatus comprising a high-frequency carrier wave source, a low-frequency source producing a first modulation voltage, a low-frequency source producing a second modulation voltage of different frequency, means additively to combine said first and second modulation voltages to produce a resultant voltage, means to differentially combine said first and second modulation voltages to produce another resultant voltage, means to modulate said carrier wave with one of said resultant voltages to produce a first output signal, means to modulate said carrier wave with the other of said resultant voltages to produce a second output signal, the carrier wave component in one of said output signals being suppressed, directional radiation means responsive to one of said output signals to propagate the signals in phase coincidence on either side of the guiding plane, and non-directional radiation means responsive to the other of said output signals to propagate the signals on either side of the guiding plane in phase coincidence.

3. In a radio beacon system, transmitting apparatus for indicating a guiding plane in accordance with the amplitude comparison method, said apparatus comprising a high-frequency carrier wave source, a low-frequency source generating a first modulation voltage, a low-frequency source generating a second modulation voltage of different frequency, means additively to combine said first and second modulation voltages to produce a resultant voltage, means differentially to combine said first and second modulation voltages to produce another resultant voltage, a modulator to combine said carrier wave with one of said resultant voltages to produce a first output signal, a balanced-modulator to combine said carrier wave with the other of said resultant voltages to produce a second output signal wherein said carrier wave is suppressed, a non-directional antenna connected to the output of said modulator, a 90° phase-shifting device, and a loop antenna connected to the output of said balanced modulator through said phase shifting device, said loop antenna being oriented in a position at which the minima thereof corresponds to said guiding plane, said non-directional antenna being disposed symmetrically with respect to said loop antenna.

4. Transmitting apparatus, as set forth in claim 3, further including means to adjust the relative amplitude of said first and second modulation voltages.

5. Transmitting apparatus, as set forth in claim 3, wherein said means additively to combine said first and second modulation voltages and said means differentially to combine said first and second modulation voltages are constituted by a pair of transformers each having a primary winding and a pair of secondary windings, the primary windings of said transformers being connected respectively to the sources of said first and second modulation voltages, one pair of corresponding secondary windings of said transformers being connected in series agreement to produce said one resultant voltage and the other pair of corresponding secondary windings of said transformers being connected in series opposition to produce said other resultant voltage.

6. In a radio beacon system, direction-finding apparatus for determining the direction of an incoming signal with respect to a guiding plane indicated by the propagation of first signals appearing in phase opposition on either side of said guiding plane and second signals appearing in phase coincidence on either side of said guiding plane, said first signals being constituted by a carrier wave modulated by first and second modulation voltages of different frequency in additive relation, said second signals being constituted by a suppressed carrier wave modulated by said first and second modulation voltages in differential relation, said direction-finding apparatus comprising a non-directional receiving antenna responsive to the incoming signal, a directional receiving antenna responsive to the incoming signal, means to generate first and second low-frequency modulation potentials corresponding in frequency to said first and second modulation voltages respectively, means to modulate the incoming signal intercepted by said non-directional antenna with a resultant potential produced by the addition of said first and second modulation potentials to develop a first output wave, means to modulate the signal intercepted by said directional antenna with another resultant voltage produced by the subtraction of said first and second modulation potentials to develop a second output wave, means to detect said first and second output waves to derive the first and second modulation voltage components therefrom, and means coupled to the output of said detecting means to indicate the relative amplitude of said modulation components.

7. Directional finding apparatus, as set forth in claim 6, wherein said means to indicate the relative amplitude of said modulation components comprises first and second selective filter networks coupled to the output of said detecting means to separate said components, first and second rectifying means coupled respectively to said filter networks to convert said components to output voltages proportional thereto, and indicating means coupled to said rectifying means to measure the relative magnitudes of said output voltages.

JOHAN WILLEM ALEXANDER.
BALTHAZAR JAN WESSELINK.

REFERENCES CITED

The following references are of record in the file of this patent:

UNITED STATES PATENTS

| Number | Name | Date |
|---|---|---|
| 2,116,667 | Chireix | May 10, 1938 |
| 2,213,273 | Earp | Sept. 3, 1940 |
| 2,293,694 | Alford | Aug. 25, 1942 |
| 2,310,202 | Alford | Feb. 9, 1943 |
| 2,422,096 | Hansell | June 10, 1947 |
| 2,433,351 | Earp | Dec. 30, 1947 |
| 2.434.955 | Pickles | Jan. 27. 1948 |